United States Patent

Mastroianni et al.

Patent Number: 5,335,562
Date of Patent: Aug. 9, 1994

[54] MULTI-SPEED REAR WHEEL DRIVE TRANSMISSION WITH REDUCED IN-NEUTRAL GEAR RATTLE

[76] Inventors: Cesare G. Mastroianni, 8111 Darwen La., Denver, N.C. 28037; Timothy E. Mick, 2165 Belle Vernon Dr., Rochester Hills, Mich. 48309

[21] Appl. No.: 988,292

[22] Filed: Dec. 8, 1992

[51] Int. Cl.⁵ .............................................. F16H 3/08
[52] U.S. Cl. ........................................ 74/329; 74/375
[58] Field of Search ................ 74/329, 339, 363, 375

[56] References Cited

U.S. PATENT DOCUMENTS

| | | | |
|---|---|---|---|
| 1,182,379 | 5/1916 | Johnson | 74/329 X |
| 2,098,691 | 11/1937 | Neff | 74/375 X |
| 2,106,841 | 2/1938 | Griswold | 74/329 X |
| 2,355,626 | 8/1944 | Bullard et al. | 192/3.54 |
| 2,506,670 | 5/1950 | Kamlukin | 74/359 |
| 2,660,900 | 12/1953 | Swenson | 74/375 |
| 2,753,728 | 7/1956 | Kelbel | 74/359 |
| 2,825,232 | 3/1958 | Sieving et al. | 74/331 |
| 2,966,067 | 12/1960 | Sömmer | 74/343 |
| 3,285,088 | 11/1966 | Atsumi et al. | 74/359 |
| 4,106,364 | 8/1978 | Zenker et al. | 74/331 X |
| 4,192,196 | 3/1980 | Bogema et al. | 74/339 |
| 4,318,305 | 3/1982 | Wetrich et al. | 74/339 |
| 4,388,838 | 6/1983 | Richards et al. | 74/331 |
| 4,483,210 | 11/1984 | Mayuzumi | 74/329 X |
| 4,513,631 | 4/1985 | Koivunen | 74/360 |
| 4,515,031 | 5/1985 | Janson | 74/375 X |
| 4,544,057 | 10/1985 | Webster et al. | 192/0.076 |
| 4,640,141 | 2/1987 | Knödel et al. | 74/357 |
| 5,105,674 | 4/1992 | Rea et al. | 74/333 |

FOREIGN PATENT DOCUMENTS

| | | | |
|---|---|---|---|
| 516261 | 10/1954 | Belgium | 74/333 |
| 3417699 | 11/1985 | Fed. Rep. of Germany | 74/375 |
| 1229348 | 4/1971 | United Kingdom | 74/363 |

OTHER PUBLICATIONS

Lynwander, Peter, *Gear Drive Systems*, Marcel Dekker, Inc., New York, 1983, pp. 223-225.

Primary Examiner—Leslie A. Braun
Assistant Examiner—Khoi Ta
Attorney, Agent, or Firm—Gifford, Groh, Sprinkle, Patmore and Anderson

[57] ABSTRACT

A multi-speed rear wheel drive transmission having synchronizers and a plurality of gears rotatable on the input shaft provides for the elimination of neutral rollover noise and optimization of common reduced size synchronizers. Gear face widths are also reduced along with shaft diameters to further optimize the transmission design. Towing restrictions are no longer required in vehicles utilizing this design. The input shaft is coaxial with the output shaft and may be connected by synchronizer to the output shaft. A countershaft is in continuous meshing contact with the output shaft.

10 Claims, 2 Drawing Sheets

MULTI-SPEED REAR WHEEL DRIVE TRANSMISSION WITH REDUCED IN-NEUTRAL GEAR RATTLE

BACKGROUND OF THE INVENTION

I. Field of the Invention

The present invention relates to transmissions. More particularly, the present invention relates to multi-speed rear wheel drive transmissions.

II. Description of the Prior Art

Typically, most rear wheel drive transmissions are constructed with a short input shaft which transmits driving torque from a source such as an engine through a pair of gears known as a headset, to a countershaft. The countershaft is located parallel to the input shaft and is positioned amid a plurality of driving gears. An output shaft, having a plurality of driven output gears surrounding the shaft, is located parallel to the countershaft. Each of the driven output gears surrounding the output shaft is in mesh with a corresponding driving gear from the plurality of gears on the countershaft. Usually the output shaft is coaxial with the input shaft. A number of axially reciprocating synchronizers are coupled to the output shaft or countershaft to engage one of the speed gears on one side and another of the speed gears on its other side. One of the speed gears on the output shaft is a reverse gear which is in mesh with the driving gear on the countershaft through an idler gear. Most often, the output shaft is coaxial with the input shaft with one of the synchronizers arranged to engage, in one position, the input shaft directly to the output shaft to effect one of the speed changes.

With the typical headset multi-speed transmission, all of the driving and driven speed gears are in continuous motion when the vehicle is stationary, the transmission is in neutral, the driving source, or engine is running and the clutch is engaged. Invariably, the driving source, or engine, generates angular accelerations in the power output characteristics that induce rotational harmonics of the drivetrain. The rotational harmonics of the rotating gears of the typical headset multi-speed transmission cause a considerable noise problem commonly referred to as "neutral roll-over noise".

With the typical headset transmission design, the torque of the driving source or engine is multiplied by the headset gear ratio. Hence, all of the speed gears that transmit torque in the power flow sequence after the headset must have an adequate face width to transmit the multiplied torque. Since the torque multiplication is transmitted through a single driving gear on the countershaft to an engaged driven gear on the output shaft, the countershaft and output shaft have to be sized and supported to withstand considerable deflection forces.

During synchronization, each gear mesh creates a different amount of reflected inertia, which, in a headset multi-speed transmission, results in the use of different synchronizers sized to effectively handle the different reflected inertia values.

Vehicles equipped with a typical headset multi-speed transmission cannot be towed without restrictions and-/or the risk of serious damage to the transmission, when the rear wheels of the vehicle are in contact with the pavement, the transmission is in neutral and the drivetrain clutch is engaged to the stationary driving source or engine. Under these conditions, the rotation of the output shaft may cause serious damage to bearings, journals, or thrust surfaces, since the rest of the transmission components are in a stationary state and adequate lubrication of the bearings, journals, gear meshes, or thrust surfaces does not occur. To avoid such damage, towing under these conditions is typically restricted to speeds of no greater than 30 miles per hour and for distances of 50 miles or less.

SUMMARY OF THE INVENTION

The present invention is directed to overcoming the various disadvantages outlined relative to the prior art headset transmission. With the transmission of the invention, neutral roll-over noise is eliminated. The gear face widths are minimized and reduced. Shaft deflections and, thus, the diameter of the shafts can be reduced. The required synchronizer capacity and size is the same in all positions and, thus, size is minimized. Vehicles containing the transmission can be towed with the transmission in neutral without restrictions since lubrication of the bearings, journals, and thrust surfaces occurs.

The multi-speed transmission of this invention is particularly designed for rear wheel drive vehicles and includes a driven input shaft. A first series of driving speed gears surrounds the input shaft. A number of single sized synchronizers are coupled to the input shaft and arranged operatively to couple with one of two of the series of driving speed gears. A countershaft arranged parallel to the input shaft has a series of driven speed gears meshing with different ones of the driving speed gears on the input shaft. One of the driven speed gears on the countershaft can be engaged with the reverse driving speed gear on the input shaft through an idler gear. An output shaft is arranged coaxial with the input shaft and is parallel with the countershaft. Means for coupling the countershaft to the output shaft include a driving output gear fixed to the countershaft in mesh with a driven output gear fixed to the output shaft. The driving output gear and driven output gear are referred to as a final drive set, hence, the arrangement of the invention is referred to as a final drive, multi-speed rear wheel drive transmission. A synchronizer on the input shaft can be used to selectively engage a gear on the input shaft or the output shaft through the driven output gear to provide one of the multiple speed changes.

With the foregoing arrangement of the invention, all of the driving and driven gears are stationary when the vehicle is stationary, the transmission is in neutral, the driving source or engine is running, and the clutch is engaged. Therefore, neutral roll-over noise is eliminated.

With the foregoing arrangement of the invention, there is no headset torque multiplication, therefore, the face widths of the speed gears can be reduced. Likewise, shaft deflections are reduced permitting a reduction in shaft diameters.

With the foregoing arrangement of the invention, the inertia of speed gears, countershaft, and output shaft is no longer a factor during synchronization, therefore, each of the synchronizers can be of the same optimum size.

Vehicles equipped with the transmission of the foregoing arrangement of the invention can be towed without restrictions and/or the risk of serious damage to the transmission when the vehicle wheels are in contact with the pavement, and the transmission is in neutral and the drivetrain clutch is engaged to the stationary driving source or engine. This is possible since rotation of the transmission output shaft induces rotation of the countershaft through the final drive gear mesh and all of the gears within the transmission, which results in oil splash and lubrication to bearings, journals, gear meshes and thrust surfaces.

BRIEF DESCRIPTION OF THE DRAWING

The advantages of the present invention will be more apparent from the following detailed description when considered in connection with the accompanying drawing wherein.

DETAILED DESCRIPTION OF THE PREFERRED EMBODIMENT

Figure 1:
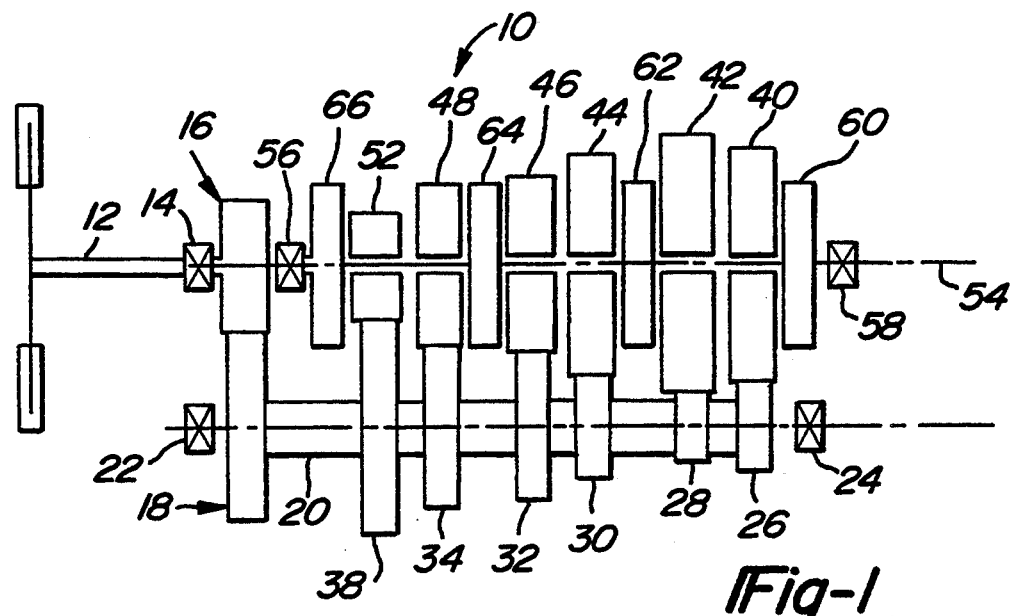
FIG. 1 is a schematic view of a typical headset multi-speed rear wheel drive transmission according to the prior art.

Referring to the drawing, and particularly to FIG. 1, a prior art six speed headset transmission 10 is shown. Input shaft 12 journalled in bearing 14 carries a driving gear 16 which is in mesh with driven gear 18 coupled to countershaft 20 journalled at its ends in bearings 22 and 24. Countershaft 20 carries a number of driving gears integrally formed with the shaft or coupled to the shaft. These driving gears 26, 28, 30, 32, 34, and 38, are respectively, the reverse, first, second, third, fourth, and sixth gears of the transmission and are in constant mesh with driven speed gears 40, 42, 44, 46, 48, and 52 surrounding an output shaft 54 journalled at its ends in bearings 56 and 58. Bearing 56 can be a bearing internally contained in input shaft 12. Synchronizers 60, 62, 64 and 66 are coupled to output shaft 54 for reciprocal axial movement to selectively engage adjacent gears on either side by the use of inter-engaging splines and known principals of synchronizer design. For example, synchronizer 62 can be moved to the right as seen in FIG. 1 to engage first gear 42 with the output shaft 54, or it can be moved to the left to engage second gear 44 with the output shaft 54.

Likewise synchronizer 66 can be moved to the right as viewed in FIG. 1 to engage sixth gear 52 with the output shaft 54, or can be moved to the left to engage input shaft 12 directly with the output shaft 54 for a 1:1 ratio, which in this case serves as the fifth gear.

It can be seen that all of the gears on both the countershaft 20 and output shaft 54 are in continuous movement through the gears 16 and 18, therefore, when the transmission is in neutral, the complete gearset is rotating. This rotation causes neutral roll-over noise. Since there is an engine torque multiplication created by the driving input gear 16 and the driven countershaft gear 18, the gears on the output shaft 54 and the countershaft 20 must have adequate face width to transfer the engine torque from the input shaft 12 to the output shaft 54. For this same reason, countershaft 20 and the output shaft 54 must be sized and supported to withstand considerable deflection forces. Furthermore, during synchronization, each of the gear meshes 40-26, 42-28, 44-30, 46-32, 48-34, 52-38, and 16-18 create different amounts of reflected inertia, requiring that the individual synchronizers 60, 62, 64 and 66 be sized to best handle the work required to effect the speed changes through the gears on either side of the individual synchronizer.

Figure 2:
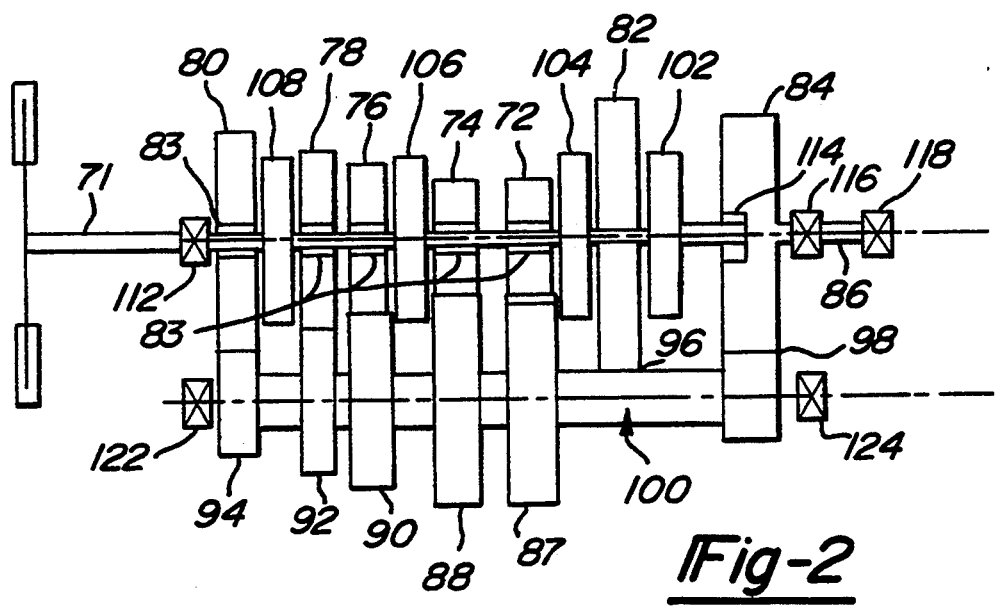
FIG. 2 is a schematic view of the transmission according to the invention.
Figure 3:
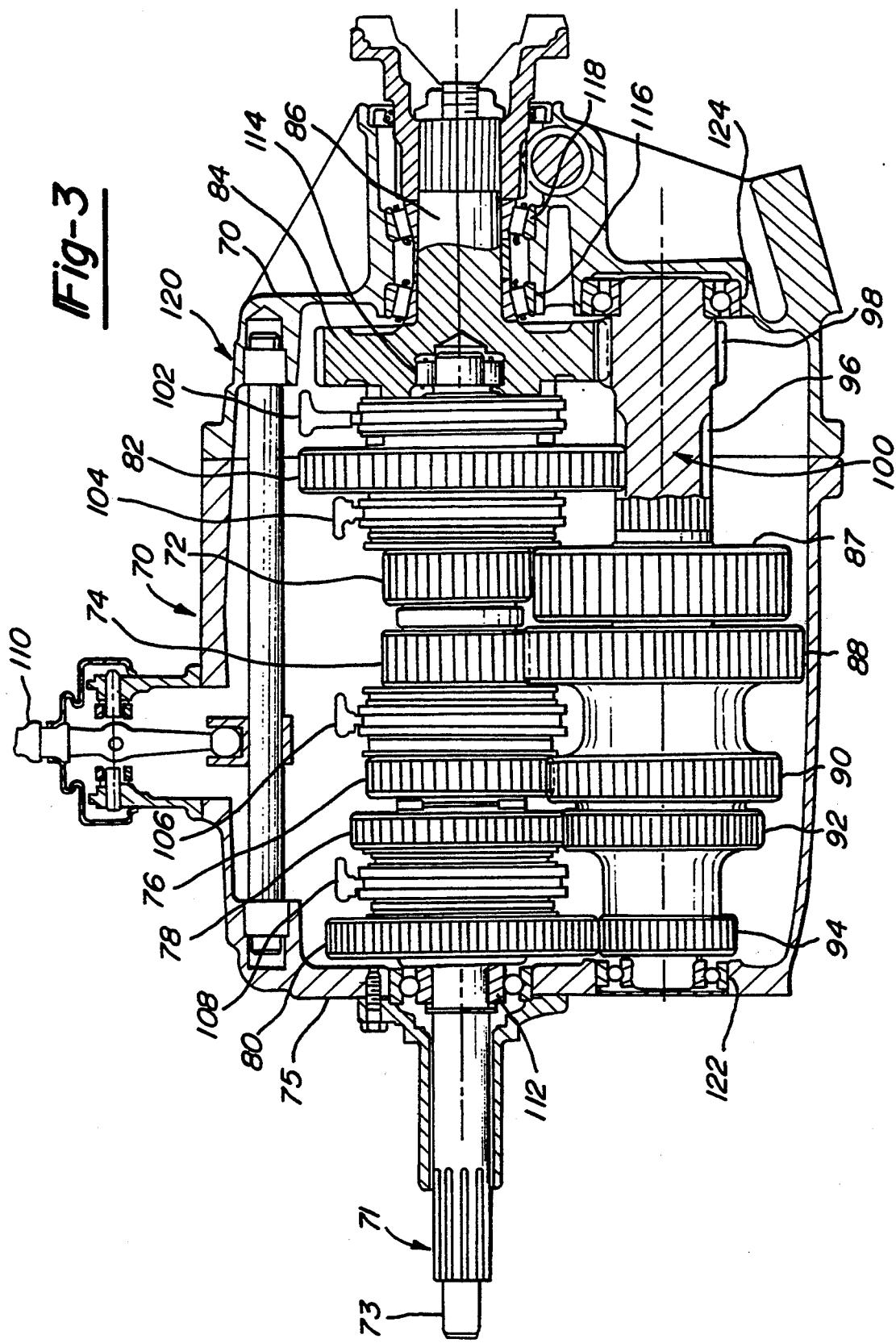
FIG. 3 is an elevational view, partially in section, of a six speed rear wheel drive transmission constructed according to the invention.

Referring now to FIGS. 2 and 3, the transmission 70, according to the invention, has an input shaft 71 extending through the wall of a front housing 75 terminating within a rear housing 120. A series of driving speed gears surround the input shaft 71 and are supported for rotation about the input shaft 71 by coaxial needle bearings 83 (FIG. 2). The driving speed gears 72, 74, 76, 78, 80 and 82 constitute, respectively, the reverse, first, second, third, fourth, and sixth gears of the transmission. The driving speed gears are in constant mesh with driven gears 87, 88, 90, 92, 94, and 96 mounted on the countershaft 100. A final drive pinion gear 98 on the countershaft 100 is in constant mesh with the driven output gear 84 on an output shaft 86.

The input shaft 71 is supported by a conventional bearing 112, such as a ball bearing or a tapered roller bearing, in the front housing 75 and by bearing 114 on the other end at the output shaft 86. The output shaft 86 is supported by spaced opposed tapered roller bearings 116 and 118 in the rear housing 120. Countershaft 100 is supported at its ends by bearing 122 and bearing 124.

Synchronizers 102, 104, 106 and 108 are coupled to the input shaft 71 for reciprocal axial movement to selectively engage adjacent gears on either side by the use of interengaging splines. For example, the synchronizer 106 can be moved to the right as viewed in FIG. 2 to engage first gear 74, or it can be moved to the left to engage second gear 76. Likewise, synchronizer 102 can be moved to the left as viewed in FIG. 2 to engage sixth gear 82 or to the right to engage the input shaft 71 directly with the output shaft 86 for a 1:1 ratio, which in this case serves as the fifth gear. The synchronizers 102, 104, 106 and 108 are actuated through the shift mechanism 110, not described in this disclosure.

Figure 4:
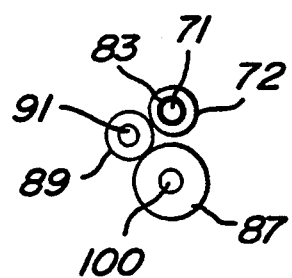
FIG. 4 is a schematic view of the reverse gears and idler gear according to the invention.

As shown in FIG. 4, an idler gear 89, mounted on a shaft 91, is in mesh with driving gear 72 and driven gear 87 to provide a reverse gearing when the synchronizer 104 is moved for engagement with driving gear 72. As is known in the art, the shaft 91 is supported by bearings (not shown) in a parallel alignment with the input shaft 71 and countershaft 100.

With the present invention, all gears are idle when the vehicle is stationary, the transmission is in neutral, the engine is running and the clutch is engaged, neutral roll-over noise is eliminated. This results in a cost savings for clutch disc design since a pre-damper stage is no longer required. Also, the elimination of the pre-damper stage reduces driveline clunk.

Since in the power flow sequence, there is no engine torque multiplication created by a gear mesh ahead of the gear meshes formed by the speed gears on the input shaft 71 and the mating gears on the countershaft 100, the face widths of the gears on the input shaft 71 and countershaft 100 can be reduced compared to the prior art design, thereby, reducing the overall length of the transmission. The only gears that will transmit multiplied engine torque are the final drive pinion 98 and gear 84. Thus, these are the only gears that will have face widths comparable to the prior art design.

With the lower torque load carried by the speed gears along with adequate bearing support provided by bearings 112, 114, 116, 118, 122 and 124, the deflections of input shaft 71 and countershaft 100 are reduced allowing reduction in shaft diameters.

It can also be seen with the present invention that the inertias of the speed gears and the countershaft are no longer a factor during synchronization because these inertias are now directly coupled to the driveshaft through the final drive gear mesh and become part of the vehicle inertia. Therefore, synchronizers 102, 104, 106 and 108 can be of the same optimum size since the work they must perform during the synchronization of any speed change involves changing the speed of only the input shaft, synchronizer assembly and clutch disc inertias.

Towing restrictions for the vehicle are no longer required, since the final drive gear set is in constant mesh and connected to the drive shaft. This enables the countershaft and speed gears to turn when the transmission is in neutral, the vehicle rear wheels are in contact with the pavement, and the clutch is engaged to the stopped engine. The turning countershaft gears provide the oil splash required to lubricate the needle bearings, support bearings, journals, gear meshes and thrust surfaces.

Although a six speed transmission is shown herein, it is clearly within the scope of the invention to encompass a seven speed transmission.

The embodiments of the invention in which an exclusive property or privilege is claimed are defined as follows:

1. A multi-speed transmission for a vehicle for connection to a driving source; said transmission comprising:
   a driven input shaft;
   a first plurality of gears rotatably supported on said input shaft, one of said gears being smaller than a remainder of said first plurality of gears;
   at least two synchronizers for coupling a selective one of the first plurality of gears to said input shaft, each of said synchronizers being of the same minimum size, said minimum size being equal to a synchronizer sized for use with said smaller gear;
   a countershaft having a second plurality of gears fixed thereto, each of said second plurality of gears meshing with a different one of the first plurality of gears;
   an output shaft parallel with said countershaft, said output shaft independently rotatable with respect to said input shaft when said first plurality of gears are not coupled to said input shaft; and
   means for meshing engagement of said countershaft to said output shaft;
   wherein when said driving source is running and said vehicle is stopped and, said first and second plurality of gears are not rotating whereby neutral roll-over noise is eliminated.

2. The transmission according to claim 1, further comprising means for selectively coupling said input shaft to said output shaft.

3. The transmission according to claim 1, wherein said output shaft is coaxial with said input shaft.

4. The transmission according to claim 1, wherein said means of meshing engagement of said countershaft to said output shaft includes a driving gear fixedly coupled to said countershaft in mesh with a driven output gear coupled to said output shaft.

5. The transmission according to claim 1, wherein said first plurality of gears comprises at least four driving speed gears and said second plurality of gears comprises at least four driven speed gears.

6. The transmission according to claim 5 wherein said transmission is contained within a housing, said input shaft having one end journalled to said housing and an opposite end journalled within said output shaft, said output shaft being journalled to said housing with spaced bearings, and said countershaft having ends journalled to said housing, said journalling coupled with selective engagement of gears on said input shaft and gear coupling of said countershaft with said output shaft allowing the use of minimum face widths for said first and second plurality of speed gears and minimizing diameters of said shafts.

7. A multi-speed drive transmission for a vehicle connected to a pair of rear wheels of a vehicle, said transmission comprising:
   a driven input shaft;
   a first plurality of speed gears surrounding said input shaft;
   at least one synchronizer coupled to said input shaft operative to couple a selective one of the first plurality of gears to said input shaft;
   a countershaft having a second plurality of gears fixed thereto, each of said second plurality of gears meshing with a different one of the first plurality of gears;
   an output shaft connected to said pair of rear wheels, said output shaft independently rotatable with respect to said input shaft when said first plurality of speed gears are not coupled to said input shaft;
   means for meshing engagement of said countershaft with said output shaft including a gear fixedly coupled to said countershaft meshing with an output gear fixedly coupled to said output shaft;
   means for lubricating said transmission when transmission is in neutral and when said rear wheels turn in response to said vehicle being towed, said means for lubricating including said first plurality of speed gears and said second plurality of gears which turn in response to movement of said rear wheels to provide an oil splash to lubricate said transmission.

8. The transmission of claim 7, further comprising a reverse gear,
   said reverse gear having an idler gear in mesh with a driving reverse gear mounted on said input shaft and a driver reverse gear fixedly mounted on said countershaft.

9. The transmission according to claim 7, wherein said output shaft is coaxial with said input shaft.

10. The transmission according to claim 7, wherein said at least one synchronizer further comprises at least two synchronizers of equal minimal size which are coupled to said input shaft.

* * * * *

UNITED STATES PATENT AND TRADEMARK OFFICE
CERTIFICATE OF CORRECTION

PATENT NO. : 5,335,562
DATED : 8/9/94
INVENTOR(S) : Cesare G. Mastroianni
Timothy E. Mick It is certified that error appears in the above-indentified patent and that said Letters Patent is hereby corrected as shown below:

```
Column 1, line 61, "and-/or"should be --and/or--.
Column 3, line 11, "drawing" should be --drawings--.
Column 3, line 25, "drawing" should be --drawings--.
Column 3, line 27, delete "Input" and insert --A headset
   transmission is a transmission which includes an input--.
Column 3, line 27, after "14" insert --which--.
Column 3, line 51, "gear" should be --gears--.
Column 4, line 17, after "86" insert --Thus, the first gear
   74 is the smallest of the gears.--
```

Signed and Sealed this

Twenty-second Day of August, 1995

Attest:

BRUCE LEHMAN

*Attesting Officer*  *Commissioner of Patents and Trademarks*